United States Patent [19]

Ryoke et al.

[11] Patent Number: 4,614,685

[45] Date of Patent: * Sep. 30, 1986

[54] MAGNETIC RECORDING MEDIUM HAVING IMPROVED RUNNING PROPERTIES

[75] Inventors: Katsumi Ryoke; Kenichi Masuyama; Eiichi Tadokoro, all of Kanagawa, Japan

[73] Assignee: Fuji Photo Film Co., Ltd., Kanagawa, Japan

[ * ] Notice: The portion of the term of this patent subsequent to Sep. 3, 2002 has been disclaimed.

[21] Appl. No.: 598,093

[22] Filed: Apr. 9, 1984

[30] Foreign Application Priority Data

Apr. 8, 1983 [JP] Japan ................................ 58-61709

[51] Int. Cl.$^4$ ................................................ B32B 5/16
[52] U.S. Cl. ..................................... 428/323; 428/329; 428/694; 428/900
[58] Field of Search ............... 428/694, 695, 323, 329, 428/900

[56] References Cited

U.S. PATENT DOCUMENTS

| | | | |
|---|---|---|---|
| 4,364,988 | 12/1982 | Andoh et al. | 428/694 |
| 4,439,486 | 3/1984 | Yamada et al. | 428/695 |
| 4,455,345 | 6/1984 | Miyatuka et al. | 428/695 |
| 4,465,737 | 8/1984 | Miyatuka et al. | 428/695 |
| 4,539,257 | 9/1985 | Ryoke et al. | 428/694 |
| 4,546,038 | 10/1985 | Yamaguchi et al. | |

FOREIGN PATENT DOCUMENTS

| | | |
|---|---|---|
| 74410 | 3/1983 | European Pat. Off. . |
| 200934 | of 1982 | Japan . |
| 135439 | of 1982 | Japan . |
| 2101911 | 1/1983 | United Kingdom . |

*Primary Examiner*—George F. Lesmes
*Assistant Examiner*—William M. Atkinson
*Attorney, Agent, or Firm*—Sughrue, Mion, Zinn, Macpeak & Seas

[57] ABSTRACT

A magnetic recording medium comprised of a non-magnetic support base having a magnetic layer provided thereon is disclosed. The magnetic layer is comprised of carbon black having an average particle size of 30 to 50 m$\mu$ and an iron oxide which contains Co. The iron oxide containing the Co has a specific surface area of 25 m$^2$/g or more. The carbon black and the iron oxide containing the Co are dispersed in a binder. By utilizing the particular type of carbon black in combination with the particular iron oxide containing Co in the magnetic layer it is possible to greatly improve the running characteristics of the magnetic recording medium as well as obtain an improved RF output.

7 Claims, No Drawings

MAGNETIC RECORDING MEDIUM HAVING IMPROVED RUNNING PROPERTIES

FIELD OF THE INVENTION

The present invention relates to a magnetic recording medium and, more specifically, to a magnetic recording medium comprising a magnetic layer which has excellent surface characteristics, a low friction coefficient with respect to various materials which make up decks used for magnetic recording/reproduction and which contact with the magnetic layer. Further the medium has excellent lubricating characteristics.

BACKGROUND OF THE INVENTION

Hitherto, in magnetic recording madia having insufficient lubricating characteristics, the surface of the magnetic layer becomes smooth due to frictional contact with parts composing the deck for magnetic recording/reproduction to increase the friction coefficient of the magnetic layer. Such magnetic recording media comprising the magnetic layer having a high friction coefficient cause a cohesion phenomenon on the running contact parts due to the presence of fine water drops under, particularly, high humidity (relative humidity of 60% or more). When the cohesion phenomenon occurs in the magnetic recording medium and the running contact parts composing the deck for magnetic recording/reproduction, stick-slip phenomenon occurs resulting in generation of audible running noise, if running tension is superior to cohesive force. Further, recorded signals in the magnetic recording medium causing the stick-slip phenomenon produce frequency modulation in the running direction and, consequently, it becomes difficult to carry out reproduction of recording in a normal state. Further, in the magnetic recording medium used for recording, when the stick-slip phenomenon occurs during reproduction, reproduction in a normal state cannot be carried out and wow, flutter and jitter phenomena occur. Inversely, when the cohesion phenomenon occurs in magnetic recording medium and the running contact parts composing the deck for magnetic recording/reproduction, running stops and, consequently, it becomes impossible to carry out recording and reproduction, if cohesive force is superior to running tension. In this field of art, this phenomenon is called "tape squeal". Such magnetic recording media and decks for magnetic recording/reproduction have a very inferior commerce value.

The squeals originate from the materials of the running system for the magnetic recording media, running tension and running rate, etc. in the deck for magnetic recording/reproduction. Further, such squeals can originate from the smoothing of the surface of the magnetic layer and increases in the surface friction coefficient, etc. of the magnetic recording media.

In order to improve the surface lubricating characteristics of the magnetic recording media, many solid lubricants and liquid lubricants are used. Examples of such lubricants include conventional finely-divided inorganic and organic powders ($Al_2O_3$, graphite, silica, $Cr_2O_3$, ZnO and carbon black, etc.), organic surface active agents and lubricants (higher hydrocarbon compounds, aliphatic alcohols, aliphatic acids, aliphatic acid esters, aliphatic acid amides, aliphatic acid salts and aliphatic acid quaternary salts, etc.).

Carbon black has been frequently studied with respect to particle sizes for the purpose of improving the running property (for example, Japanese Patent Application (OPI) Nos. 62604/75 and 124123/81). It is known that when carbon black having a particle size of a certain value or more is blended, the face of the magnetic recording medium becomes coarse and the contact area of the magnetic recording medium during running decreases reducing the friction coefficient.

Although the running property can be improved to a certain degree by using such particles, it is still not sufficient.

SUMMARY OF THE INVENTION

Accordingly, the present inventors have carried out studies on the relation between the particle size of carbon black and running properties.

In general, when carbon black is blended with many binders or lubricants, the strength that the carbon black is given by the other materials or the strength that the carbon black bestows on the binders, etc. does not depend upon the particle size of the carbon black. It is believed that the hardness of primary or secondary particles of carbon black formed when blending with binders or lubricants, etc. or the hardness bestowed on the binders varies depending on factors such as the properties of the carbon black, the process for producing it and raw materials for it, etc. However, the present inventors have now found that furnace carbon black for rubber which has a specified particle size function so as to increase the strength and improve the running properties when blended with binders or lubricants, and that a remarkable effect is produced when it is combined with Co-containing magnetic iron oxide.

A primary object of the present invention is to provide novel additives for the magnetic layer and to provide a magnetic recording medium having excellent running properties.

Another object of the present invention is to provide a magnetic recording medium having a good sensitivity.

Namely, the present invention relates to a magnetic recording medium comprising a magnetic layer provided on a non-magnetic base, wherein said magnetic layer contains carbon black having an average primary particle size of 30 to 50 m$\mu$ and Co-containing iron oxide having a specific surface area of 25 m$^2$/g or more.

DETAILED DESCRIPTION OF THE INVENTION

Carbon black used in the present invention has an average primary particle size of 30 to 50 m$\mu$ and preferably 32 to 45 m$\mu$. Typical examples of such carbon black which is commercially available include the following.

| Name | Kinds | Average Particle size | Amount of DBP absorption | Specific surface area | Maker |
| --- | --- | --- | --- | --- | --- |
| Seast 116 | MAF | 30 m$\mu$ | 133 ml/100 g | 54 m$^2$/g | Tokai Carbon Co. |
| Seast SO | FEF | 41 m$\mu$ | 114 ml/100 g | 45 m$^2$/g | Tokai Carbon Co. |
| Asahi #60 | FEF | 50 m$\mu$ | 115 ml/100 g | 40 m$^2$/g | Asahi Carbon Co. |
| Asahi #60H | MAF | 35 m$\mu$ | 125 ml/100 g | 49 m$^2$/g | Asahi Carbon Co. |

-continued

| Name | Kinds | Average Particle size | Amount of DBP absorption | Specific surface area | Maker |
| --- | --- | --- | --- | --- | --- |
| Diablack SF | (Corresponding to FEF and MAF) | 40 mμ | 127 ml/100 g | 56 m²/g | Mitsubishi Chemical Industries Co. |
| Diablack E | FEF | 43 mμ | 124 ml/100 g | 43 m²/g | Mitsubishi Chemical Industries Co. |
| Diablack 550M | MAF | 41 mμ | 131 ml/100 g | 50 m²/g | Mitsubishi Chemical Industries Co. |
| Nitteron #10S | FEF | 50 mμ | 113 ml/100 g | 42 m²/g | Nittetsu Chemical Industrial Co. |
| Hokutan Carbon #100 | FEF | 50 mμ | 105 ml/100 g | 42 m²/g | Hokutan Carbon Co. |

Of these, Seast SO, Asahi #60, Asahi #60H, Diablack SF, Diablack E and Diablack 550M are preferably used.

The carbon black used in the present invention is furnace carbon for rubber, which is called MAF (medium antifriction) and FEF (Good extrusion) classified in the carbon black industry.

The average primary particle size of these kinds of carbon black is typically in the range of 30 to 50 mμ.

It is preferred that the amount of dibutyl phthalate (DBP) absorption of carbon black used in the present invention is 100 ml or more based on 100 g of carbon black, and more preferably 100 to 150 ml. It is preferred that the specific surface area of carbon black used in the present invention measured by a nitrogen absorption method is 35 m²/g or more, and, more preferably 35 to 60 m²/g.

Useful types of Co-containing magnetic iron oxide used in the present invention include those which have a specific surface area of 25 m²/g or more. Preferably, the specific surface area of the Co-containing magnetic iron oxide is 30 m²/g or more. More preferably, the specific surface area of the Co-containing magnetic iron oxide is 35 m²/g or more.

It is preferred that the Co content of the magnetic iron oxide used in the present invention is in the range of 0.1 to 40% by weight. Preferably, the Co content of the magnetic iron oxide is in the range of 0.2 to 8% by weight.

In the Co-containing magnetic iron oxide used in the present invention, Co may be added any time before or after the formation of α-FeOOH (goethite) which is a raw material formagnetic iron oxide, after formation of magnetite or after burning of magnetite.

In the present invention, the cobalt may be present in the magnetic iron oxide in the form of coating or may be doped by thermal treatment after the formation of coating of Co. Fine Co-containing iron oxide particles may be attached to a core material. Further, epitaxial growth may be carried out on the surface of gamma hematite previously formed.

The Co-containing magnetic iron oxide used in the present invention can be prepared in conventional methods as described in *IEEE TRANSACTIONS ON MAGNETICS*, MAG.17, No. 6, p. 3014 Nov. 1981 and U.S. Pat. Nos. 4,267,207, 4,066,564, 4,069,164, 4,066,565, 4,015,030, 4,200,680 and 3,026,215.

Carbon black in the present invention is used in an amount of 0.05 to 20 parts based on 100 parts of Co-containing magnetic iron oxide. Preferably, it is used in an amount of 1 to 15 parts based on 100 parts of Co-containing magnetic iron oxide.

Carbon black having an average primary particle size of 30 mμ to 50 mμ used in the present invention give a remarkable effect improving the running properties, but video sensitivity is lost when such carbon black is used. Accordingly, it is used as a combination with Co-containing magnetic iron oxide having a specific surface area of 25 m²/g more, preferably 30 m²/g or more, and more preferably 35 m²/g or more, by which the improvement of the running properties and the improvement of the video sensitivity can be attained. The amount of carbon atom can generally be increased as the specific surface area of Co-containing magnetic iron oxide increases.

Useful binders for present invention include known thermoplastic resins, thermosetting resins or reaction type resins and mixtures of them.

Useful thermoplastic resins include those having a softening point of 150° C. or less, an average molecular weight of 10,000 to 200,000 and a degree of polymerization of about 200 to 500. Examples of thermoplastic resins include vinyl chloride-vinyl acetate copolymers, vinyl chloride-vinylidene chloride copolymers, vinyl chloride-acrylonitrile copolymers, acrylic acid ester-acrylonitrile copolymers, acrylic acid ester-vinylidene chloride copolymers, acrylic acid ester-styrene copolymers, methacrylic acid ester-acrylonitrile copolymers, methacrylic acid ester-vinylidene chloride copolymers, methacrylic acid ester-styrene copolymers, urethane elastomers, nylon-silicone resins, nitrocellulose-polyamide resins, polyvinyl fluoride, vinylidene chloride-acrylonitrile copolymers, butadiene-acrylonitrile copolymers, polyamide resins, polyvinyl butyral, cellulose derivatives (cellulose acetate butyrate, cellulose diacetate, cellulose triacetate, cellulose propionate, nitrocellulose, etc.), styrene-butadiene copolymers, polyester resins, chlorovinyl ether-acrylic acid ester copolymers, amino resins, various kinds of synthetic rubbers and mixtures of them.

Useful thermosetting resins or reaction type resins include those which have a molecular weight of 200,000 or less while in the coating solution and cause condensation or addition reaction by heating after coating and drying to result in an infinite molecular weight. Further, among these resins, those which do not soften or fuse before thermal decomposition are preferred. Examples of the resins include phenol resins, epoxy resins, polyurethane setting type resins, urea resins, melamine resins, alkyd resins, silicone resins, acryl reactive resins, epoxypolyamide resins, nitrocellulose-melamine resins, mixtures of high molecular weight polyester resin and isocyanate prepolymer, mixtures of methacrylic acid salt copolymer and diisocyanate prepolymer, mixtures of polyester polyol and polyisocyanate, urea-formaldehyde resins, mixtures of low molecular weight glycol/- high molecular weight diol/triphenylmethane triisocyanate, polyamine resins and mixtures thereof.

Examples of these resins have been described in Japanese Patent Publication No. 26890/81 and U.S. Pat. No. 4,135,016.

The amount of the binder blended with the Co-containing magnetic iron oxide used in the present invention is in the range of 10 to 200 parts by weight based on 100 parts by weight of Co-containing magnetic iron oxide.

Useful additives include dispersing agents, lubricants and abrasives, etc.

The time when the carbon black is added during the production process can be suitably selected. It may be added any time before or after previous dispersing, after main dispersing, before or after previous kneading, or after main kneading.

Further, addition of Co-containing magnetic iron oxide in the production process should be carried out before main kneading and/or main dispersing. Accordingly, it is possible to attach (absorb) one or more of lubricants, thermoplastic resins and dispersing agents to carbon black and/or Co-containing magnetic iron oxide suspended or dispersed in an organic solvent in the process prior to main despersing or main kneading.

Further, the magnetic recording medium of the present invention can be prepared using materials (dispersing agents, lubricants and abrasives, etc.) according to the process, described in Japanese Patent Publication No. 26890/81 and U.S. Pat. No. 4,135,016.

The present invention is illustrated in greater detail by the following examples. In examples, "part" means "part by weight". The scope of the invention is not limited to those examples.

EXAMPLE 1

After the following composition was sufficiently kneaded by putting it in a ball mill in turn, 20 parts of "Dismodur L-75" (trade name of polyisocyanate compound produced by Bayer Co.) was added and uniformly dispersed by blending to obtain a magnetic coating.

| | |
|---|---|
| Co-containing $\gamma$-Fe$_2$O$_3$ powder (Co content: 2.25% by weight; specific surface area: 30 m$^2$/g) | 300 parts |
| Nitrocellulose | 30 parts |
| Polyurethane (molecular weight: about 30,000) | 20 parts |
| Vinyl chloride-vinyl acetate-vinyl alcohol copolymer | 10 parts |
| "Asahi carbon #60H" (average particle size: 35 m$\mu$) | 25 parts |
| Butyl palmitate | 5 parts |
| Abrasive (Cr$_2$O$_3$) | 20 parts |
| Myritic acid | 2 parts |
| Cyclohexanone | 300 parts |
| Methyl ethyl ketone | 300 parts |
| Toluene | 300 parts |

This magnetic coating was applied to a surface of a polyester base film, followed by carrying out orientation and drying to produce a magnetic tape. Thereafter, it was subjected to mirror face processing and cut in ½ inch width to produce a sample.

COMPARATIVE EXAMPLE 1

A magnetic coating was prepared using the same composition as in Example 1, except that the carbon black was replaced with "Asahi #80" (25 parts) (average particle size: 23 m$\mu$, amount of DBP absorption: 113 ml, specific surface area: 118 m$^2$/g), and a tape was produced in the same manner as in Example 1.

COMPARATIVE EXAMPLE 2

A magnetic coating was prepared using the same composition as in Example 1, except that the carbon black was replaced with "Asahi #70" (25 parts) (average particles size: 27 m$\mu$, amount of DBP absorption: 102 ml, specific surface area:80 m$^2$/g), and a tape was produced in the same manner as in Example 1.

COMPARATIVE EXAMPLE 3

A magnetic coating was prepared using the same composition as in Example 1, except that the carbon black was replaced with "Asahi #55" (25 parts) (average particle size: 76 m$\mu$, amount of DBP absorption: 84 ml, specific surface area: 24 m$^2$/g), and a tape was produced in the same manner as in Example 1.

COMPARATIVE EXAMPLE 4

A magnetic coating was prepared using the same composition as in Example 1, except that the carbon black was replaced with "Asahi #50" (25 parts) (average particle size: 94 m$\mu$, amount of DBP absorption: 62 ml, specific surface area: 21 m$^2$/g), and a tape was produced in the same manner as in Example 1.

COMPARATIVE EXAMPLE 5

A magnetic coating was prepared using the same composition as in Example 1, except that the carbon black was replaced with "Asahi #35" (25 parts) (average particle size: 115 m$\mu$, amount of DBP absorption: 48 ml, specific surface area: 19 m$^2$/g), and a tape was produced in the same manner as in Example 1.

COMPARATIVE EXAMPLE 6

A magnetic coating was prepared using the same composition as in Example 1, except that a Co-containing $\gamma$-Fe$_2$O$_3$ powder having the same Co content as in Example 1 but a specific surface area of 23 m$^2$/g (300 parts) was used as a magnetic material instead of the Co-containing $\gamma$-Fe$_2$O$_3$ powder having a specific surface area of 30 m$^2$/g, and a tape was produced in the same manner as in Example 1.

Results of measuring characteristics of tapes produced in Example 1 and Comparative Examples 1-6 are shown in Table 1.

TABLE 1

| Test sample | Number of runs | RF output (dB) |
|---|---|---|
| Example 1 | more than 100 | 0 |
| Comparative Example 1 | 16 | 1.0 |
| Comparative Example 2 | 28 | 0.3 |
| Comparative Example 3 | 33 | 0.9 |
| Comparative Example 4 | 16 | 1.0 |
| Comparative Example 5 | 8 | 1.5 |
| Comparative Example 6 | more than 100 | −1.7 |

Methods of measuring characteristics in Table 1 and the criterion for judging thereof will now be described. The number of runs of the test samples in the tape deck means the number of runs during which tape squeal occurred when the runs were repeated under a condition of 21° C. and 87% RH. The criterion for judging is the number at which each sample generates audible sound with the running system of the tape deck. Further, the RF output means an output when carrying out recording and reproduction at 4 MHz, which is shown as relative dB.

As can be understood from the example of the present invention, carbon black used in the present invention has a remarkable effect of, particularly, increasing the possible number of runs which can be made before tape squeal occurs, as compared with carbon black having other particles sizes. Further, increasing the possible number of runs which can be made before tape squeal occurs and improvement of the RF output can be achieved at the same time by combining the carbon black with the magnetic materials of the present invention.

EXAMPLE 2

After the following composition was sufficiently kneaded by putting it in a ball mill in turn, 20 parts of "Desmodur L-75" (trade name of polyisocyanate compound produced by Bayer Co.) was added and uniformly dispersed by blending to produce a magnetic coating.

| | |
|---|---|
| Co-containing $\gamma$-$Fe_2O_3$ (Co content: 4.0% by weight: specific surface area: 35 $m^2/g$) | 300 parts |
| Vinyl chloride-vinyl acetate-vinyl alcohol copolymer | 30 parts |
| Epoxy resin (epoxy group content: 0.56) | 30 parts |
| Carbon black ("Asahi carbon #60H") | 15 parts |
| Dimethyl polysiloxane (viscosity: 1000 cs at 25° C.) | 6 parts |
| Butyl palmitate | 5 parts |
| Abrasive ($Al_2O_3$) | 20 parts |
| Cyclohexanone | 300 parts |
| Methyl ethyl ketone | 250 parts |
| Ethyl acetate | 250 parts |

This magnetic coating was applied to a surface of a polyester base film, followed by carrying out orientation and drying to produce a magnetic tape. The tape was cut into ½ inch widths in the same manner as Example 1 to produce a sample.

COMPARATIVE EXAMPLE 7

A magnetic tape was produced using the same composition as in Example 2, except that the magnetic powder was replaced with 300 parts of $\gamma$-$Fe_2O_3$ (specific surface area: 35 $m^2/g$).

COMPARATIVE EXAMPLE 8

A magnetic tape was produced using the same composition as in Example 2, except the magnetic powder was replaced with 300 parts of Co-containing $\gamma$-$Fe_2O_3$ (Co content: 4% by weight, specific surface area: 23 $m^2/g$).

COMPARATIVE EXAMPLE 9

A magnetic tape was produced using the same composition as in Example 2, except that carbon black was not added.

Results of measuring characteristics of tapes produced in Example 2 and Comparative Examples 7-9 are shown in Table 2.

TABLE 2

| Sample | Magnetic Material | Carbon Black | Number of runs | RF output |
|---|---|---|---|---|
| Example 2 | Co-containing: 35 $m^2/g$ | Asahi Carbon #60H | more than 60 | 0 dB |
| Comparative Example 7 | Co-free: 35 $m^2/g$ | Asahi Carbon #60H | more than 60 | less than −10 dB |
| Comparative Example 8 | Co-containing: 23 $m^2/g$ | Asahi Carbon #60H | more than 60 | −2.3 dB |
| Comparative Example 9 | Co-containing: 35 $m^2/g$ | None | 10 | +2.4 dB |

The methods of measuring characteristic values in Table 2 are the same as those described above with respect to Table 1.

It is understood from the example of the present invention that combinations of a magnetic material composed of Co-containing $\gamma$-$Fe_2O_3$ having 35 $m^2/g$ and Asahi Carbon #60H are effective for improving the number of runs and the RF output.

EXAMPLE 3

After the following composition was sufficiently kneaded by putting it in a ball mill in turn, 20 parts of "Desmodur L-75" (trade name of polyisocyanate compound produced by Bayer Co.) was added and uniformly dispersed by blending to produce a magnetic coating.

| | |
|---|---|
| Co-containing $\gamma$-$Fe_2O_3$ (specific surface area: 30 $m^2/g$) | 300 parts |
| Vinyl chloride-vinyl acetate-maleic acid copolymer | 30 parts |
| Epoxy resin (epoxy group content: 0.56) | 30 parts |
| Carbon black (Diablack E, average particle size: 43 m$\mu$) | 10 parts |
| Anhydrosorbitan tetrastearic acid ester | 3 parts |
| Butyl palmitate | 5 parts |
| Cyclohexanone | 300 parts |
| Methyl ethyl ketone | 250 parts |

After the viscosity of this magnetic coating was controlled, it was applied to the surface of a polyester base film, followed by carrying out orientation and drying to produce a magnetic tape. The type was cut into ½ inch widths to produce a sample in the same manner as in Example 1.

COMPARATIVE EXAMPLE 10

A magnetic tape was produced using the same composition as in Example 3, except that the carbon black was replaced with 10 parts of "Asahi Carbon Thermal FT" (average particle size: 90 m$\mu$).

COMPARATIVE EXAMPLE 11

A magnetic tape was produced using the same composition as in Example 3, except that the carbon black was replaced with 10 parts of "Colombian Carbon Neospectra Mark II" (average particle size: 13 m$\mu$).

COMPARATIVE EXAMPLE 12

A magnetic tape was produced using the same composition as in Example 3, except that the magnetic material was replaced with 300 parts of Co-containing $\gamma$-$Fe_2O_3$ (specific surface area: 23 $m^2/g$).

Results of measuring characteristics of tapes produced in Example 3 and Comparative Examples 10-12 are shown in Table 3.

TABLE 3

| | Specific surface area of magnetic material | Particle size of carbon black | Number of runs | RF output |
|---|---|---|---|---|
| Example 3 | 30 m²/g | 43 mµ | 82 | 0 dB |
| Comparative Example 10 | " | 90 mµ | 20 | +0.2 dB |
| Comparative Example 11 | " | 13 mµ | 17 | +0.4 dB |
| Comparative Example 12 | 23 m²/g | 43 mµ | 80 | −0.3 dB |

Methods of measuring characteristic values in Table 3 are the same as those illustrated about Table 1. But the measurement of the number of runs was carried out under a condition of 20° C. and 68% RH.

It is understood from the example of the present invention that combinations of a Co-containing magnetic gamma iron oxide powder having a specific surface area of beyond 30 m²/g and carbon black having a particle size of 30 to 50 mµ are particularly effective for increasing the number of runs which can be made without problem such as tape squeal taking place and improving the RF output.

While the invention has been described in detail and with reference to specific embodiment thereof, it will be apparent to one skilled in the art that various changes and modifications can be made therein without departing from the spirit and scope thereof.

What is claimed is:

1. A magnetic recording medium, comprising:
   a non-magnetic base having thereon;
   a magnetic layer comprising carbon black having an average primary particle size of 32 to 45 mµ and Co-containing iron oxide having a specific surface area of 30 m²/g or more, the dibutyl phthalate absorption of the carbon black particles being 100 ml or more based on 100 g of the carbon black, wherein said carbon black has a specific surface area in the range of 35m²/g to 60 m²g, and wherein the Co content in the Co-containing iron oxide is 2.25 to 8% by weight.

2. A magnetic recording medium as claimed in claim 1, wherein the binder is present in an amount in the range of 10 to 200 parts by weight based on 100 parts by weight of the Co-containing iron oxide.

3. A magnetic recording medium as claimed in claim 1, wherein the dibutyl phthalate absorption of the carbon black particles is 100 to 150 ml per 100 g of the carbon black.

4. A magnetic recording medium as claimed in claim 1, wherein the carbon black is selected from the group consisting of carbon black exhibiting the following characteristics:
   average primary particle size of 41 mµ, the dibutyl phthalate absorption of the carbon black is 114 ml per 100 g of carbon black, specific surface area of 45 m²/g;
   average primary particle size of 50 mµ, the dibutyl phthalate absorption of the carbon black is 115 ml per 100 g of carbon black, specific surface area of 40 m²/g;
   average primary particle size of 35 mµ, the dibutyl phthalate absorption of the carbon black is 125 ml per 100 g of carbon black, specific surface area of 49 m²/g;
   average primary particle size of 40 mµ, the dibutyl phthalate absorption of the carbon black is 127 ml per 100 g of carbon black, specific surface area of 56 m²/g;
   average primary particle size of 43 mµ, the dibutyl phthalate absorption of the carbon black is 124 ml per 100 g of carbon black, specific surface area of 43 m²/g; and
   average primary particle size of 41 mµ, the dibutyl phthalate absorption of the carbon black is 131 ml per 100 g of carbon black, specific surface area of 50 m²/g.

5. A magnetic recording medium as claimed in claim 1, wherein, the carbon black is present in an amount in the range of 1 part to 15 parts per 100 parts of the Co-containing iron oxide and wherein the binder is present in an amount in the range of 10 to 200 parts by weight based on 100 parts by weight of the Co-containing iron oxide.

6. A magnetic recording medium as claimed in claim 1, wherein the carbon black is present in an amount in the range of 0.05 parts to 20 parts per 100 parts of the Co-containing iron oxide.

7. A magnetic recording medium as claimed in claim 6, wherein the carbon black is present in an amount in the range of 1 part to 15 parts per 100 parts of the Co-containing iron oxide.

* * * * *